United States Patent
Geppert (10) Patent No.: US 7,024,227 B1
(45) Date of Patent: Apr. 4, 2006

(54) STATE MACHINE FOR USE IN CALL PROCESSING SYSTEM AND METHOD OF OPERATION

(75) Inventor: Mike F. G. Geppert, Richardson, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/370,702

(22) Filed: Aug. 9, 1999

(51) Int. Cl.
  *H04Q 7/20* (2006.01)
(52) U.S. Cl. .................................. 455/561; 455/418
(58) Field of Classification Search .............. 455/560, 455/561, 422, 403, 524, 418, 422.1; 375/220
  See application file for complete search history.

(56) References Cited

U.S. PATENT DOCUMENTS

| | | | | |
|---|---|---|---|---|
| 4,782,517 A | * | 11/1988 | Bernardis et al. | 379/201.05 |
| 5,889,816 A | * | 3/1999 | Agrawal et al. | 375/220 |
| 5,995,831 A | * | 11/1999 | Gulliford et al. | 455/560 X |
| 6,006,340 A | * | 12/1999 | O'Connell | 713/600 |
| 6,308,080 B1 | * | 10/2001 | Burt et al. | 455/561 X |

\* cited by examiner

*Primary Examiner*—Nay Maung
*Assistant Examiner*—Philip J Sobutka (57) ABSTRACT

There is disclosed, for use in a wireless network, a call control processor containing finite state machines that are capable of communicating with one another and exchanging events, without requiring intervention by the operating system. The call control processor comprises a first state machine capable of performing a call processing task. The first state machine has an internal queue capable of storing events associated with the call processing task, where each event causes the first state machine to perform a selected action. The first state machine is capable of communicating with a second state machine of the call control processor by storing events directly into the internal queue associated with the second state machine. The second state machine subsequently executes the events stored in its internal queue.

18 Claims, 6 Drawing Sheets

| | A(1,1) | A(1,2) | A(1,3) | A(1,4) | A(1,5) | A(1,6) | A(1,7) |
|---|---|---|---|---|---|---|---|
| A(1,1) | FOR EVENT 1 | SEND TO QUEUE 6 | AS EVENT 3 | SEND TO QUEUE 5 | AS EVENT 2 | SEND TO NO QUEUE | AS NO EVENT |
| A(2,1) | FOR EVENT 2 | SEND TO NO QUEUE | AS NO EVENT | SEND TO NO QUEUE | AS NO EVENT | SEND TO NO QUEUE | AS NO EVENT |
| A(3,1) | FOR EVENT 3 | SEND TO NO QUEUE | AS NO EVENT | SEND TO NO QUEUE | AS NO EVENT | SEND TO NO QUEUE | AS NO EVENT |
| A(4,1) | FOR EVENT 4 | SEND TO QUEUE 3 | AS EVENT 8 | SEND TO NO QUEUE | AS NO EVENT | SEND TO NO QUEUE | AS NO EVENT |
| A(5,1) | FOR EVENT 5 | SEND TO QUEUE 5 | AS EVENT 5 | SEND TO QUEUE 6 | AS EVENT 4 | SEND TO QUEUE 9 | AS EVENT 2 |
| A(6,1) | FOR EVENT 6 | SEND TO NO QUEUE | AS NO EVENT | SEND TO NO QUEUE | AS NO EVENT | SEND TO NO QUEUE | AS NO EVENT |

FIG. 6

STATE MACHINE FOR USE IN CALL PROCESSING SYSTEM AND METHOD OF OPERATION

TECHNICAL FIELD OF THE INVENTION

The present invention is directed, in general, to telecommunications systems and, more specifically, to a call processing system utilizing a table-driven finite state machine.

BACKGROUND OF THE INVENTION

Wireless networks generally comprise a large number of geographically dispersed base stations that provide wireless communications in a designated coverage area served by a wireless service provider. Groups of base stations are connected by land lines to a common mobile switching center (MSC) that provides high-level control over the group of base stations and connects the base stations to the public switched telephone network (PSTN). Each base station (BS) covers a particular geographic area (or cell) and may be comprised of a base transceiver station and a base station controller (BSC).

Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, such as T1/E1 interfaces, and RF transmitters and RF receivers.

Conventional base transceiver stations contain a number of channel cards, wherein each channel card is capable of servicing a call by processing voice and/or data signals transmitted to a mobile station in a forward channel and by processing voice and/or data signals received from the mobile station in a reverse channel. The channel cards are in turn controlled by one or more digital call control processors. In a typical architecture, a base station may contain a primary call control processor and a secondary (or standby) call control processor that operates in the event of a failure of the primary call control processor.

The call control processor executes an application program that performs the basic functions of the base transceiver station, such as call processing, communications protocols, fault management, and the like. Under the control of the application program, the call control processor effectively becomes a plurality of state machines. A state machine is a basic building block of software systems that follow protocols such as call processing, communications protocols, fault management, and other management operations. A state machine as used in this context is described in terms of the following:

State: A place of rest or no change in the state machine.
Event: A stimulus that could cause the state machine to operate and possibly to change to a new state.
Action: An activity performed by the state machine in response to an event.

Many call control processors are table-driven finite state machines. That is, a message or signal is received by a software task and is converted into an "event". The event is actually a look-up value into a table that contains the current state. At the entry point identified by the event is a list of actions that need to be run for the given event and for the given state. After all of the actions have been executed, a state transition can occur.

In many systems, state machines interact with one another by passing messages through the operating system. The state machines perform tasks and interact using two queues. One queue is an internal queue, or state machine queue where events are accumulated and the state machine operates on the events in the internal queue. The other queue is the operating system (O/S) message queue. When a task that owns a state machine needs to pass a message to another task, the task uses the O/S message queue to pass the message.

A task pends on the queue until a message arrives. The O/S then schedules the task to run according to some priority scheme or algorithm that the O/S manages. When the task runs, the message is read and a conversion to an event is done. The event is then placed into the internal queue. The internal queue is not an O/S queue because of the overhead in using O/S queues. Events in the internal queue are then used to "walk" (or operate) the state machine until the internal queue is empty. An action caused by an event can generate other events, which get placed into the internal queue.

Speed problems can occur in a call processing system that implements state machines as described above. The most convenient way for state machines to pass events to one another is to pass messages through the O/S. Unfortunately, this requires the O/S to run its scheduling algorithm every time a message is sent. Since some events must be sent to many other tasks, the call processing system is slowed down as the O/S repetitively runs its scheduling algorithm.

There is therefore a need in the art for improved state-machine-based call processing systems. In particular, there is a need for state machines that are capable of interacting with one another with a minimum amount of operating system overhead. More particularly, there is a need for an improved call processing system that uses state machines that can share events without exchanging messages via the operating system.

SUMMARY OF THE INVENTION

To address the above-discussed deficiencies of the prior art, it is a primary object of the present invention to provide, for use in a call control processor, a mechanism for telling a first (or source) state machine that a second (or destination) state machine is also interested in a event when it is generated, and to send the desired event to the second state machine's internal queue directly. The destination task (or state machine) does not react to the received event until scheduled by the operating system (O/S) and the task began processing its internal queue.

Accordingly, in an exemplary embodiment of the present invention, there is provided, for use in a base station of a wireless network, a call control processor comprising a first state machine capable of performing a call processing task, the first state machine comprising a queue capable of storing a plurality of events associated with the call processing task, each of the plurality of events operable to cause the first state machine to perform a selected action, wherein the first state machine is capable of communicating with a second state machine of the call control processor by storing at least one event in a queue associated with the second state machine.

According to one embodiment of the present invention, the queue of the first state machine is capable of receiving an incoming event from the second state machine.

According to another embodiment of the present invention, the first state machine executes the task in response to receipt of a message retrieved from an operating system (O/S) queue associated with the first state machine.

According to still another embodiment of the present invention, the first state machine executes the task in response to receipt of a ping message generated by the call control processor.

According to yet another embodiment of the present invention, the ping message is received on a periodic basis.

According to a further embodiment of the present invention, the first state machine further comprises an array capable of translating an event associated with the first state machine into a corresponding event associated with the second state machine.

According to a still further embodiment of the present invention, the first state machine further comprises a linked list capable of translating an event associated with the first state machine into a corresponding event associated with the second state machine.

According to a yet further embodiment of the present invention, the first state machine further comprises a composite array and linked list capable of translating an event associated with the first state machine into a corresponding event associated with the second state machine.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
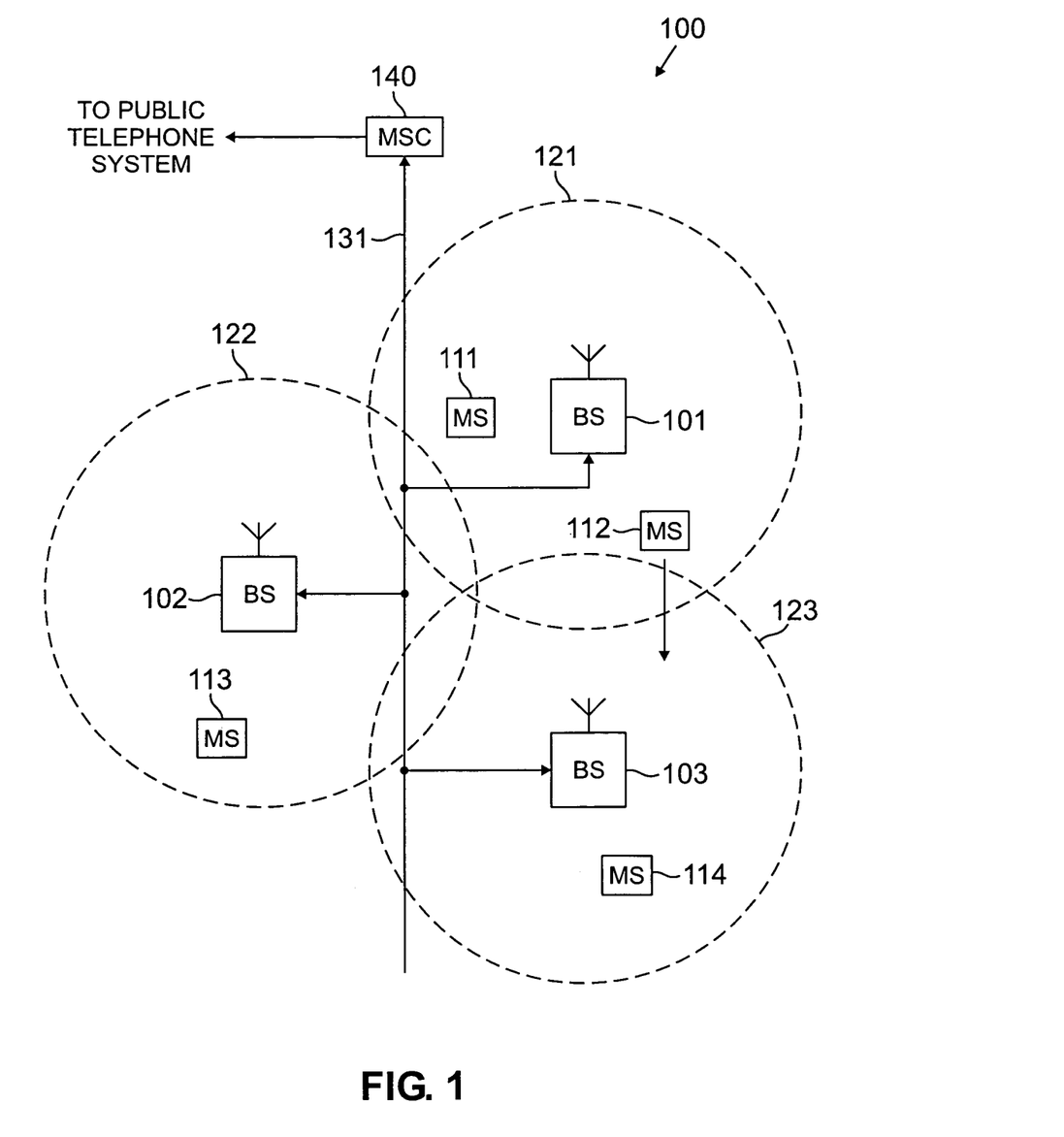
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well know, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
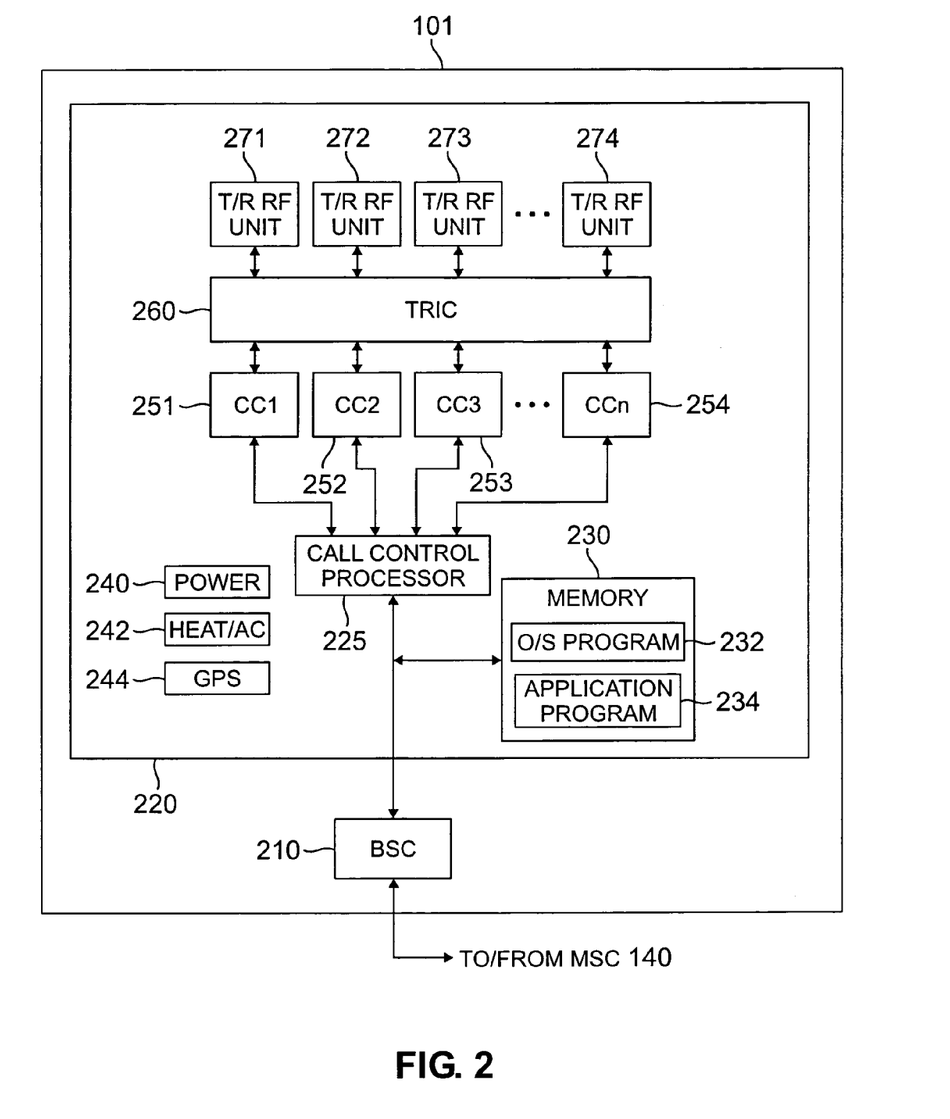
FIG. 2 illustrates in greater detail an exemplary base station in accordance with one embodiment of the present invention.

FIG. 2 illustrates in greater detail exemplary base station 101 in accordance with one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises call control processor 225, memory 230, power unit 240, heat/AC unit 242, global positioning system (GPS) unit 244, channel cards (CC) 251–254, transmitter-receiver interface controller (TRIC) 260, and transceiver (T/R) RF units 271–274.

Power unit 240 provides electrical power to all of the components of BTS 220. Heat/AC unit 242 regulates the ambient temperature in BTS 220. GPS unit 244 supplies the components of BTS 220 with a highly accurate clock signal received from one or more satellites in the global positioning system. Call control processor 225 executes operating system (O/S) program 232 and application program 234 stored in memory 230. Call control processor 225 also stores configuration data, intermediate calculation values, and voice and data signals in memory 230.

Channel cards 251–254, occasionally referred to hereafter as CC1, CC2, CC3, and CCn, respectively, are capable of transmitting and receiving voice and/or data signals with mobile stations in the coverage area of BS 101. In the forward channel, BSC 210 receives baseband voice and/or data signals from MSC 140. The baseband voice/data signals are transferred to call control processor 225, along with any control messages necessary to set up and tear down call connections. The forward channel baseband voice/data signals for a selected call are then transferred to a selected one of channel cards 251–254 that handles the call.

In conventional wireless networks, the channel card then generates an intermediate frequency (IF) signal from the baseband voice/data signal using some type of multiple access technique. For example, in a code division multiple access (CDMA) system, channel cards 251–254 use unique codes to spread a baseband voice/data signal to a higher frequency IF signal. In a frequency division multiple access (CDMA) system, channel cards 251–254 use each baseband voice/data signal to modulate a particular frequency component of an IF signal.

TRIC 260 comprises digital-to-analog (D/A) converters that convert the forward channel digital IF voice/data signals to analog signals. TRIC 260 also comprises switching circuitry capable of switching the forward channel analog IF signals from any one of channel cards 251~254 to any one of T/R RF units 271–274. T/R RF units 271–274 then convert the analog IF signals to forward channel RF signals that are transmitted to the mobile stations.

In the reverse channel, T/R RF units 271–274 receive RF voice/data signals from the mobile stations. T/R RF units 271–274 then demodulate the reverse channel RF signals to generate IF signals that are transmitted to TRIC 260. TRIC 260 also comprises analog-to-digital (A/D) converters that convert the reverse channel analog IF voice/data signals to digital IF voice/data signals. TRIC 260 also comprises switching circuitry capable of switching the reverse channel digital IF signals from any one of T/R RF units 271–274 to any one of channel cards 251–254. Channel cards 251–254 then process the reverse channel digital IF signals in order to recover the reverse channel baseband voice/data signals. Call control processor 225 then transfers the reverse channel baseband voice/data signals to MSC 140 via BSC 210.

In an advantageous embodiment of the present invention, call control processor 225, under control of application program 234, comprises a plurality of finite state machines capable of performing selected call processing tasks. For example, call control processor 225 may receive commands from BSC 210 to establish a call connection or to tear down a call connection. If call control processor 225 is implemented as a dual processor system, one of the processors may be instructed to change from standby mode to active mode, or vice versa.

The finite state machines in call control processor 225 are table driven. That is, when an event is received by a state machine, the state machine uses the event as an index into the table for the particular state that the state machine is in at that time. The table entries instruct the state machine regarding the function(s) to run and the state to which the state machine should transition. Since call control processor 225 supports multiple simultaneous calls, multiple instances of particular state machines may be active in call control processor 225 at any point in time.

The present invention overcomes the problems associated with the prior art state machines by utilizing improved state machines capable of sharing events directly with one another, thereby bypassing the O/S queues. The present invention allows state machines in call processor 225 to share events in the internal queues of the state machines.

Figure 3:
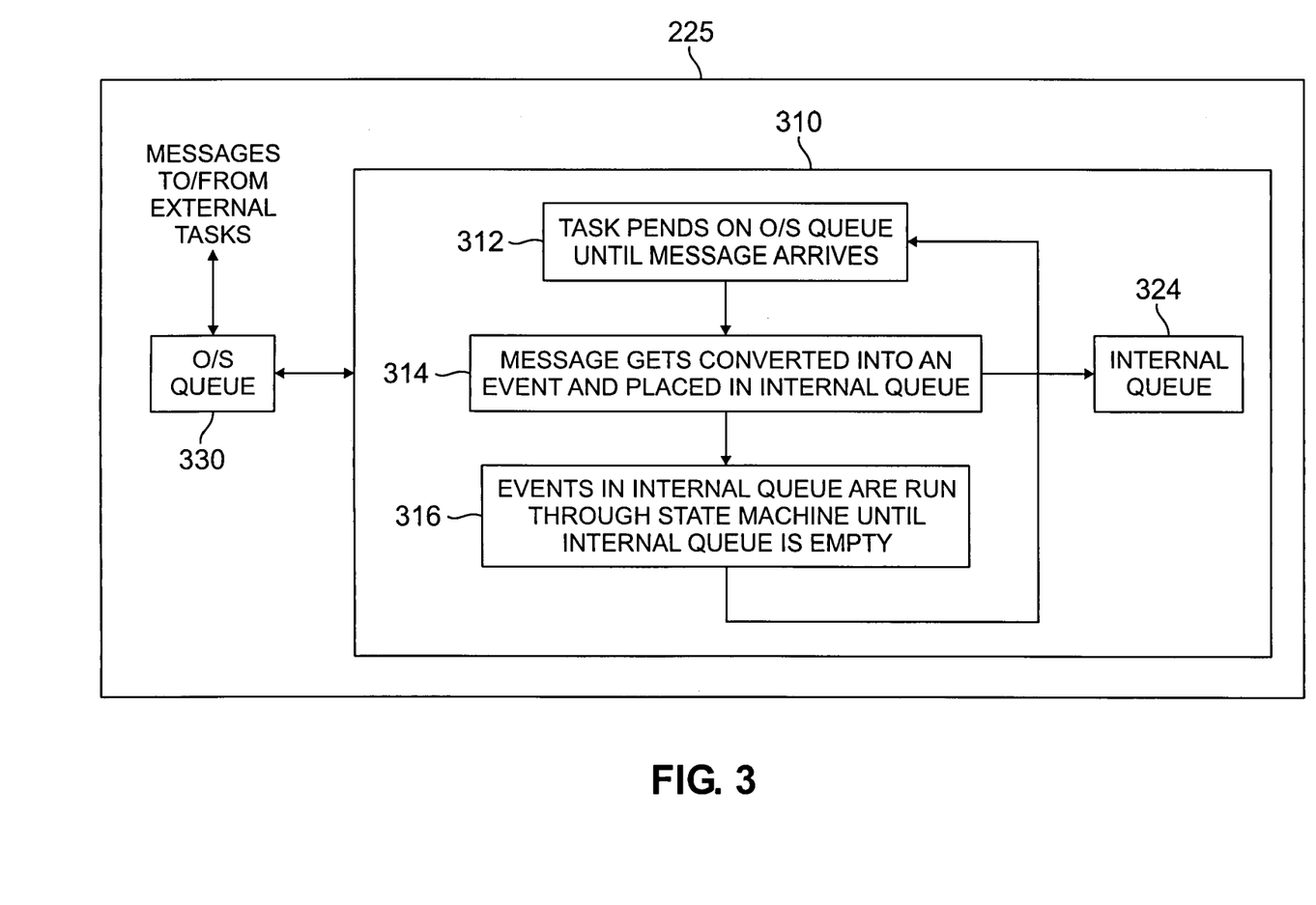
FIG. 3 illustrates the operational flow of a task in an exemplary finite state machine in a call control processor in accordance with one embodiment of the present invention.

FIG. 3 illustrates the operational flow of a task in exemplary finite state machine 310 in call control processor 225 in accordance with one embodiment of the present invention. State machine 310 operates in response to messages received from operating system (O/S) queue 330, which is controlled by O/S program 232. State machine 310 uses O/S queue 330 to pass messages to other tasks in call control processor 225 and to communicate with other components in BS 101 and wireless work 100 that are external to call control processor 225.

State machine 310 may retrieve an incoming message from O/S queue 330 in response to the arrival of the incoming message or as part of a scheduled routine. In either event, the task waits on O/S queue 330 until some message is eventually received that triggers the execution of the task (process step 312). Next, state machine 310 translates the message into an event. As mentioned above, an event is a stimulus that may cause state machine 310 to perform some action and possibly to change to a new state. The translated event is placed in internal queue 324 of state machine 310 for subsequent execution by state machine 310 (process step 314). The execution of the translated event also may cause state machine 310 to generate other new events that are placed in internal queue 324 or that are placed in the internal queue of other state machines of call control processor 310. State machine 310 executes the event(s) in internal queue 324 until internal queue 324 is empty (process step 316). Each event that is executed may cause other events to be generated and placed in internal queue 324. Ultimately, internal queue 324 eventually becomes empty and the task again returns to a state of waiting for a new message to arrive in O/S queue 330.

An advantageous aspect of the present invention is the ability of each state machine in call control processor 225 to "share" an event with a "target" state machine by placing the event directly into the internal queue of the target state machine. This allows each state machine to bypass using O/S queue 330 each time an event must be sent to another state machine. As a result, the delays associated with the scheduling algorithm of O/S queue 330 are not incurred and the state machines in call control processor 225 operate more efficiently.

According to one embodiment of the present invention, each task must know that another task is interested in a particular event that the task controls. In the table driven system implemented in the present invention, events are used as indexes into tables that dictate what actions are to be run and what new state to transition to. It is very unlikely that the two tasks will have the same index, so state machine 310 must transform (or translate) from one index to the other. Each task also must know where to deliver the transformed event.

As noted above, an event can be generated by a external message coming into the task or it can be generated by one of the actions executed by state machine 310 as part of the task. In the present invention, internal queue 324 is a unique and single point for all of the events to be gathered. To allow the state machines to communicate directly with one another, each state machine determines whether or not a particular event is of interest to at least one other task executed by at least one other state machine in call control processor 225. If so, the state machine transforms the particular event to the appropriate value(s), and places it in the queue(s) of the other state machine(s). To accomplish this, the tasks register with one another and indicate a translation for each event.

Each task needs to be "woken up" periodically to process the events in its internal queue. This is accomplished in call control processor 225 by using a periodic "ping" procedure. Ping procedures are well known and are usually used to make sure a task is properly functioning and capable of responding to messages. In call control processor 225, the periodic ping checks the status of internal queue 324 when the ping message is received from O/S queue 330.

There are a number of methods for performing event translation in each state machine and sending the translated event to the correct target queue. These methods include: array, linked list, and hybrid linked list. A linked list or a fixed size array can be allocated to hold the information needed to do the translation and sending of the events. An array has the advantage of being faster than a linked list, but a decision must be made on how many different tasks can request an event as this will determine the amount of memory to allocate. A linked list has the advantage of only taking the amount of memory needed, but performance is lost in order to manage the linked list. An important factor in deciding between a linked list or an array (or some mixture thereof) is the number of events in the state machine that need to be reused by other tasks.

Figure 4:
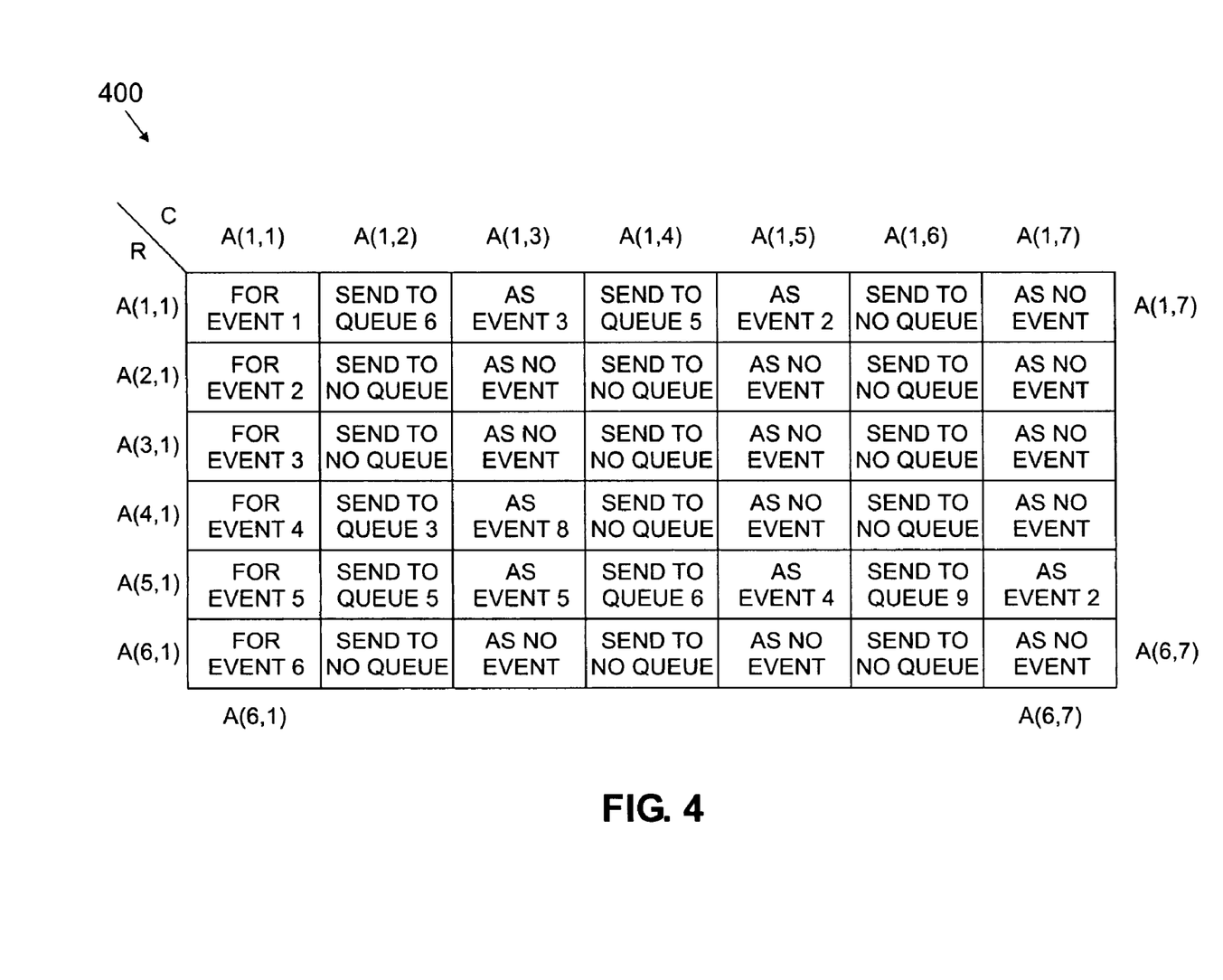
FIG. 4 illustrates an array for performing event translation and directing events to other tasks for use in a finite state machine in a call control processor in accordance with one embodiment of the present invention.

FIG. 4 illustrates array 400 for performing event translation and directing events to other tasks for use in a finite state machine in a call control processor in accordance with one embodiment of the present invention. The array elements are arranged in rows (R) and columns (C) and are identified by the identifier A(R,C), which indicates the position of each array element. Events are used to index into the array elements in the leftmost column (i.e., A(1,1)–A(6,1)). State machine 310 then performs the actions and event translations stored in the remaining array elements in the same row before moving to the next row, until the entire array has been run.

For example, Event 1 is used to index into array element A(1,1), labeled "For Event 1." State machine 310 then performs the actions and event translations located in A(1,2) through A(7). Actions are indicated by the label "Send to Queue n" and event translations are indicated by the label "As Event n."

Every event must have an entry in array 400 and must have as many array elements in its row as the longest array entry. Event 5, which includes array elements A(5,1) through A(5,7), has the longest entry in array 400. Event 6, which includes array elements A(6,1) through A(6,7), has no real entries in array 400. Hence, the action and translations in array elements A(6,2) through A(6,7) contain only "Send to No Queue" and "As No Event." Similarly, Event 2 and Event 3 also contain the non-functional entries "Send to No Queue" and "As No Event." A decision must be made regarding how many queues are allowed to receive an event, and an error condition must be generated if many tasks request the same event.

Figure 5:
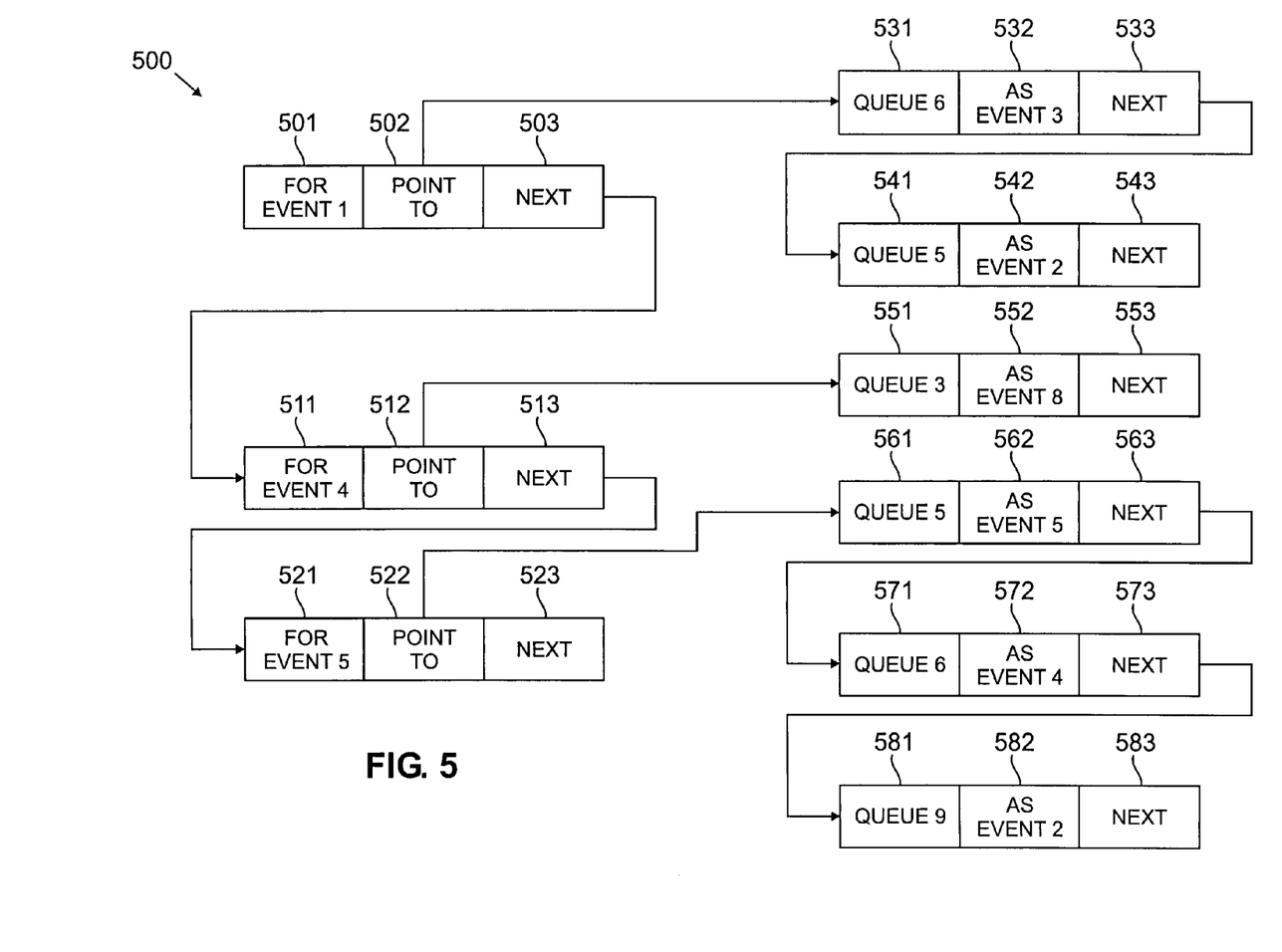
FIG. 5 illustrates a linked list for performing event translation and directing events to other tasks for use in a finite state machine in a call control processor in accordance with one embodiment of the present invention.

FIG. 5 illustrates linked list 500 for performing event translation and directing events to other tasks for use in a finite state machine in a call control processor in accordance with one embodiment of the present invention. Linked list 500 is a list of only the events that need to be shared. These events point to another linked list of other queues and translation events. Some extra overhead is incurred in that every event that comes into a task "walks" the linked list to find out if it is even needed. A first pass optimization may be used to ensure the linked list was sorted so that a determination of whether or not an event was even in the list could be made without going through the entire list each time.

Linked list 500 is equivalent to array 400. For example, elements 501–503, elements 531–533 and elements 541–542 are equivalent to array elements A(1,1)–A(1,7) in array 400. If Event 1 (element 501) is processed, state machine 310 is directed by element 502 ("Point To") to elements 531 ("Queue 6") and 532 ("As Event 3"), and subsequently to elements 541 ("Queue 5") and 542 ("As Event 2"). Elements 531, 532, 541 and 542 correspond to array elements A(1,2), A(1,3), A(1,4), and A(1,5), respectively. Advantageously, linked list 500, unlike array 400, does not contain entries for Event 2, Event 3, or Event 6, all of which are undefined.

Figure 6:
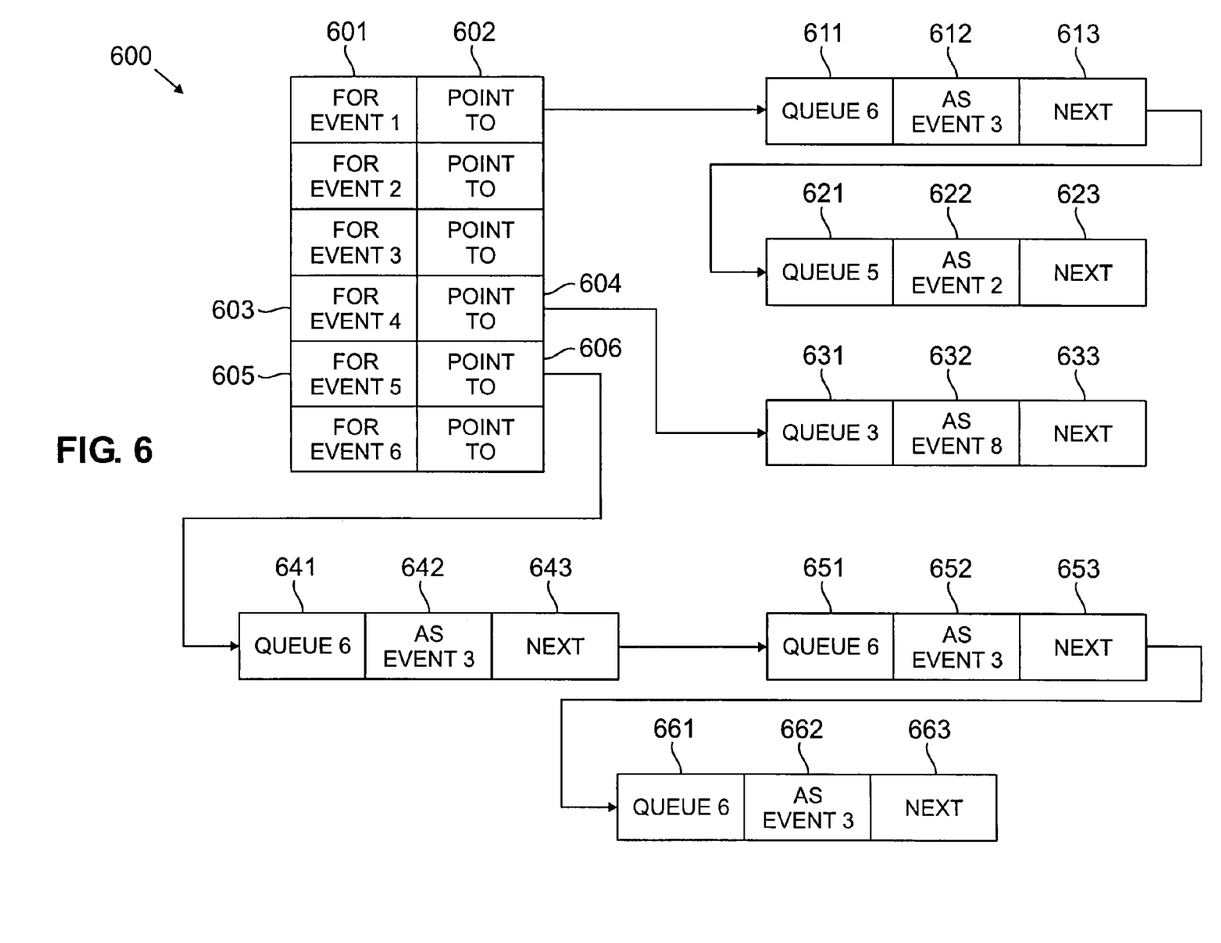
FIG. 6 illustrates a hybrid linked list for performing event translation and directing events to other tasks for use in a finite state machine in a call control processor in accordance with one embodiment of the present invention.

FIG. 6 illustrates hybrid linked list 600 for performing event translation and directing events to other tasks for use in a finite state machine in a call control processor in accordance with one embodiment of the present invention. Hybrid linked list 600 comprises a small array that uses events as an index, as shown by elements 601 and 602, elements 603 and 604, and elements 605 and 606. Each of the pairs of elements in the small array leads to a linked list that manages the queues and translation events.

In most systems, there are many events and only a few that need to be shared. In this instance, an array might be wasteful, so a linked list is a more advantageous method for implementing the state machines in call control processor 225. The drawback to the linked list is that the linked list must be walked even to determine if an event needs to be translated and sent to another task. The array implementation has the advantage of using the event as an index and can find out if the event needs to go to another task in a predictable amount of time.

Although the present invention has been described in detail, those skilled in the art should understand that they can make various changes, substitutions and alterations herein without departing from the spirit and scope of the invention in its broadest form.

What is claimed is:

1. For use in a base station of a wireless network, a call control processor comprising:
a first state machine capable of performing a call processing task in response to receipt of a message retrieved from an operating system queue associated with said first state machine, said first state machine comprising an internal queue capable of storing a plurality of events associated with said call processing task, each of said plurality of events operable to cause said first state machine to perform a selected action, wherein said first state machine is capable of communicating with a second state machine of said call control processor by storing at least one event directly into an internal queue associated with said second state machine.

2. The call control processor set forth in claim 1 wherein said queue of said first state machine is capable of receiving an incoming event from said second state machine.

3. The call control processor set fort in claim 1 wherein said first state machine further comprises an array capable of translating an event associated with said first state machine into a corresponding event associated with said second state machine.

4. The call control processor set forth in claim 1 wherein said first state machine further comprises a linked list capable of translating an event associated with said first state machine into a corresponding event associated with said second state machine.

5. The call control processor set forth in claim 1 wherein said first state machine further comprises an array and a linked list capable of translating an event associated with said first state machine into a corresponding event associated with said second state machine.

6. The call control processor set forth in claim 1 wherein said first state machine executes said task in response to receipt of a ping message generated by said call control processor.

7. The call control processor set forth in claim 6 wherein said ping message is received on a periodic basis.

8. A wireless network comprising:
a plurality of base stations capable of communicating with a plurality of mobile stations located in a coverage area of said wireless network, each of said plurality of base stations comprising:
a plurality of RF transceivers, each of said RF transceiver capable of transmitting at least one of voice signals and data signals in a forward channel to a selected one of said plurality of mobile stations and capable of receiving at least one of voice signals and data signals in a reverse channel from said selected mobile station; and
a call control processor capable of controlling said plurality of RF transceivers, said call control processor comprising a first state machine capable of performing a call processing task in response to receipt of a message retrieved from an operating system queue associated with said first state machine, said first state machine comprising an internal queue capable of storing a plurality of events associated with said call processing task, each of said plurality of events operable to cause said first state machine to perform a selected action, wherein said first state machine is capable of communicating with a second state machine of said call control processor by storing at least one event directly into an internal queue associated with said second state machine.

9. The wireless network set forth in claim 8 wherein said queue of said first state machine is capable of receiving an incoming event from said second state machine.

10. The wireless network set forth in claim 8 wherein said first state machine further comprises an array capable of translating an event associated with said first state machine into a corresponding event associated with said second state machine.

11. The wireless network set forth in claim 8 wherein said first state machine further comprises an array and a linked list capable of translating an event associated with said first state machine into a corresponding event associated with said second state machine.

12. The wireless network set forth in claim 8 wherein said first state machine executes said task in response to receipt of a ping message generated by said call control processor.

13. The wireless network set forth in claim 12 wherein said ping message is received on a periodic basis.

14. The wireless network set forth in claim 8 wherein said first state machine further comprises a linked list capable of translating an event associated with said first state machine into a corresponding event associated with said second state machine.

15. The method set forth in claim 14 wherein the first state machine comprises an array used to perform the step of translating.

16. The method set forth in claim 14 wherein the first state machine comprises a linked list used to perform the step of translating.

17. The method set forth in claim 14 wherein the first state machine comprises an array and a linked list used to perform the step of translating.

18. For use in a base station in a wireless network, a method of operating a call control processor comprising the steps of:

retrieving from an operating systems queue associated with a first state machine of the call control processor a message capable of causing the first state machine to perform a call processing task;

retrieving from an internal queue associated with the first state machine of the call control processor a stored event capable of causing the first state machine to perform an action;

generating from the stored event at least one resultant event;

determining if a second state machine of the call control processor utilizes the at least one resultant event;

translating the at least one resultant event into a corresponding event associated with the second state machine; and storing the corresponding event directly into an internal queue associated with the second state machine by the first state machine for subsequent execution by the second state machine.

\* \* \* \* \*

UNITED STATES PATENT AND TRADEMARK OFFICE
CERTIFICATE OF CORRECTION

PATENT NO. : 7,024,227 B1 Page 1 of 1
APPLICATION NO. : 09/370702
DATED : April 4, 2006
INVENTOR(S) : Mike F. G. Geppert It is certified that error appears in the above-identified patent and that said Letters Patent is hereby corrected as shown below:

Column 11, claim 14, line 31, insert -- an array and -- after the term "comprises".

Signed and Sealed this

Fifth Day of June, 2007

JON W. DUDAS
*Director of the United States Patent and Trademark Office*